United States Patent
Liu et al.

(10) Patent No.: US 9,008,077 B2
(45) Date of Patent: Apr. 14, 2015

(54) METHOD FOR QUICK MAP RECOVERY IN CASE OF ERROR IN MOCA

(75) Inventors: Changwen Liu, San Diego, CA (US); Arndt Mueller, San Diego, CA (US); Ronald Lee, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 1265 days.

(21) Appl. No.: 12/415,875

(22) Filed: Mar. 31, 2009

(65) Prior Publication Data

US 2010/0238790 A1  Sep. 23, 2010

Related U.S. Application Data

(60) Provisional application No. 61/160,986, filed on Mar. 17, 2009.

(51) Int. Cl.
 *H04L 12/28* (2006.01)
(52) U.S. Cl.
 CPC .................................. *H04L 12/2861* (2013.01)
(58) Field of Classification Search
 USPC ............. 370/352, 400, 349, 253, 337; 726/11
 See application file for complete search history.

(56) References Cited

U.S. PATENT DOCUMENTS

| | | | |
|---|---|---|---|
| 2004/0114566 A1* | 6/2004 | Lim et al. | 370/349 |
| 2005/0201339 A1* | 9/2005 | Mangin et al. | 370/337 |
| 2007/0177630 A1 | 8/2007 | Ranta et al. | |
| 2008/0117919 A1* | 5/2008 | Kliger et al. | 370/400 |
| 2008/0151805 A1 | 6/2008 | Vayanos et al. | |
| 2008/0181170 A1 | 7/2008 | Branlund et al. | |
| 2009/0024895 A1 | 1/2009 | Lin | |
| 2009/0254794 A1* | 10/2009 | Malik et al. | 714/776 |
| 2010/0146616 A1* | 6/2010 | Garrett et al. | 726/11 |
| 2010/0158021 A1* | 6/2010 | Kliger et al. | 370/400 |
| 2012/0269090 A1* | 10/2012 | Kliger et al. | 370/253 |

FOREIGN PATENT DOCUMENTS

CN  101283546 A  10/2008

\* cited by examiner

*Primary Examiner* — Dang Ton
*Assistant Examiner* — Lionel Preval
(74) *Attorney, Agent, or Firm* — Richard Bachand; Bruce Greenhaus; Sheppard, Mullin, Richter & Hampton LLP

(57) ABSTRACT

A method comprises receiving a predetermined length of information, the information including a first MAC Protocol Data Unit (MPDU) being of variable length and including at least one Sub-MPDU; independently decoding the first Sub-MPDU and a plurality of additional portions of the received information, each portion having a length equal to the length of one Sub-MPDU; processing data from the first Sub-MPDU; and determining from the processed data how many of the other decoded portions constitute Sub-MPDUs of the received MPDU.

21 Claims, 5 Drawing Sheets

METHOD FOR QUICK MAP RECOVERY IN CASE OF ERROR IN MOCA

CROSS-REFERENCE TO RELATED APPLICATIONS

This application claims priority from U.S. Provisional Patent Application Ser. No. 61/160,986 filed Mar. 17, 2009, which is incorporated herein by reference in its entirety.

FIELD OF DISCLOSURE

The disclosed system and method relate to the transmission of data through a network. More particularly, the disclosed system and method relate to recovering from failing to receive or correctly process data packets in networks.

BACKGROUND

In a conventional Multimedia Over Coaxial Alliance (MoCA) network, data packets are transmitted over a coaxial communication channel. Communication through the network is managed by a Network Coordinator node (NC) that transmits Beacons and Media Access Plan (MAP) packets. The Beacons are transmitted at regular intervals (e.g., every 10 ms) and identify the channel time clock (CTC), the MoCA network version, the time of the next admission control frame (ACF), and when a NC handoff will occur (e.g., when the NC changes from one node to another node).

MAP packets are transmitted more frequently by the NC than are Beacons and provide scheduling information that identify when each network node will be transmitting data through the network. Each node connected to the network relies on the MAPs in order to transmit and receive data through the network. Many factors may prevent a network node from correctly receiving a MAP. For example, GSM interference caused by a cellular phone operating near a network node may corrupt a MAP by creating co-channel and/or adjacent channel interference with the network node. Due to the length of GSM interference, e.g., approximately 0.577 ms, a network node may miss or incorrectly process one or more MAPs.

In conventional MoCA networks, losing a MAP packet will prevent a network node from receiving the subsequently transmitted MAPs as each MAP identifies a MAP packet transmission interval, e.g., the interval when the next MAP will be transmitted. FIG. 1 is a timing diagram illustrating a network node failing to receive a MAP and then recovering from this failure in a conventional MoCA network. As illustrated in FIG. 1, NODE1 fails to receive MAP2 from the NC. The NC continues to broadcast MAPs over the network; but NODE1 fails to receive or correctly process MAP3 thru MAP6 because NODE1 failed to receive or correctly process MAP2. In a conventional MoCA network, NODE1 must wait until it receives and processes the next Beacon, BEACON2, to determine the MAP transmission interval and once again receive and correctly process MAP packets, e.g., MAP7. Since MAPs are more frequently transmitted than the Beacons, a node that fails to receive or correctly process one MAP packet may not receive the next several MAPs as it will have to wait for the next Beacon. Thus, once a node fails to receive a MAP, the node is essentially disconnected from the network for a period (from MAP2 to MAP7 for the example of FIG. 1) as it will not receive subsequent MAP packets and determine when data is going to be transmitted through the network until the node receives the next Beacon. In addition, the node will not be able to request any time slots from the NC for transmitting any buffered data packets until the next Beacon is received.

Accordingly, an improved method for recovering from missing a MAP transmission is desirable.

SUMMARY

In some embodiments, a method comprises receiving a predetermined length of information, the information including a first MAC Protocol Data Unit (MPDU) being of variable length, the MPDU including at least one Sub-MPDU; independently decoding the first Sub-MPDU and a plurality of additional portions of the received information, each portion having a predetermined length. In one embodiment, each additional portion has a length equal to the length of the first Sub-MPDU. The method further comprises processing data from the first Sub-MPDU; and determining from the processed data how many of the other decoded portions constitute Sub-MPDUs of the received MPDU and in one embodiment, determining from the processed data the length of the additional Sub-MPDUs.

In some embodiments, a network node, comprises a computer readable storage medium and a processor in data communication with the computer readable storage medium. The processor is configured to receive a predetermined length of information, the information including a first MAC Protocol Data Unit (MPDU) being of variable length and including at least one Sub-MPDU, independently decode the first Sub-MPDU and a plurality of additional portions of the received information, each portion having a length equal to the length of one Sub-MPDU, process data from the first Sub-MPDU, and determine from the processed data how many of the other decoded portions constitute Sub-MPDUs of the received MPDU.

In some embodiments, a method comprises using information received in a previously received packet of interest to determine the interval between transmission of the last received packet of interest and the next packet of interest, and thus identify the time at which a next packet of interest will arrive, the information being used after a failure to find and decode a previously transmitted information packet of interest that was transmitted after the previously received packet of interest; upon determining when the next packet of interest will arrive, decoding the next packet of interest in portions, each portion being independently encoded; and using information from the first of the portions of the next packet of interest to determine how many such decoded portions are actually part of the next packet of interest. Since each portion is independently encoded, each can be independently decoded.

The methods may be embodied in a computer readable storage medium encoded with computer program code that may be loaded to a processor, such that when the processor executes the code it performs the method.

DETAILED DESCRIPTION

Figure 7:
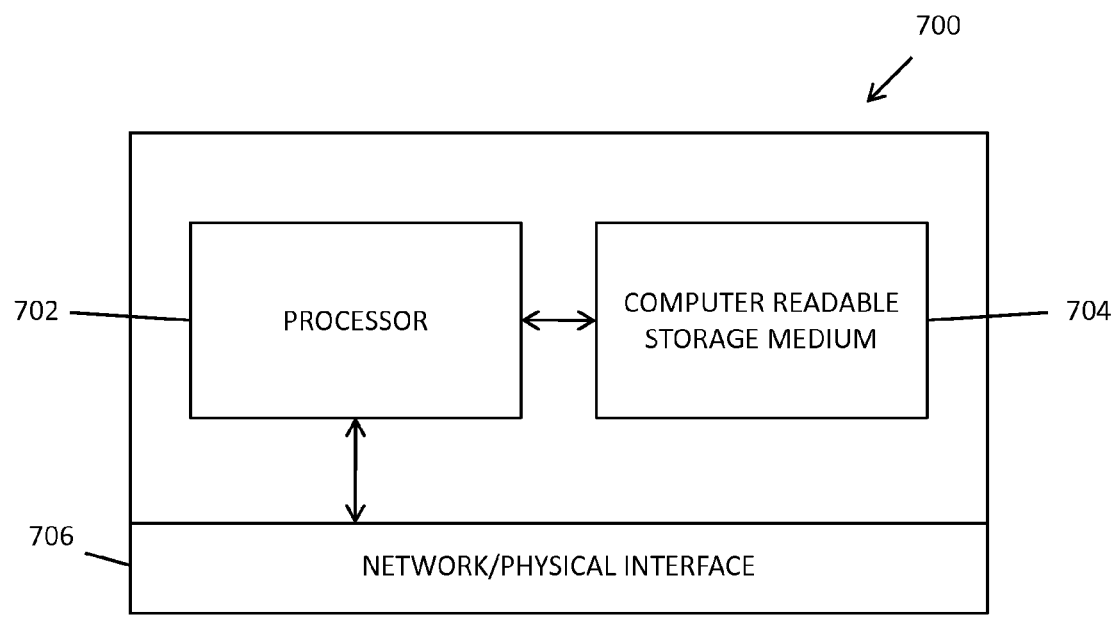
FIG. 7 illustrates one embodiment of a network node configured to process data packets and recover from failing to receive a packet in accordance with the method illustrated in FIGS. 3 and 4.

A system and method for recovering from failing to receive or correctly process MAPs are now described. One embodiment of the disclosed system and method is implemented in networks in which the MAPs are transmitted at predetermined fixed intervals. The network may include a Network Coordinator (NC) that manages data transmission between the network nodes. FIG. 7 illustrates a simplified block diagram of one example of a network node. As shown in FIG. 7, network node 700 may include a processor 702 in communication with a computer readable storage medium 704 and a physical interface that enables the node 700 to send and receive data through a network. Processor 702 may be any computational device including, but not limited to, a central processing unit (CPU), a microcontroller, or like device. Computer readable storage medium 704 may be any type of memory including, but not limited to, random access memory (RAM), read only memory (ROM), Flash memory, a hard disk drive, or like device configured to store data and instructions that may be executed by the processor 702.

Figure 1:
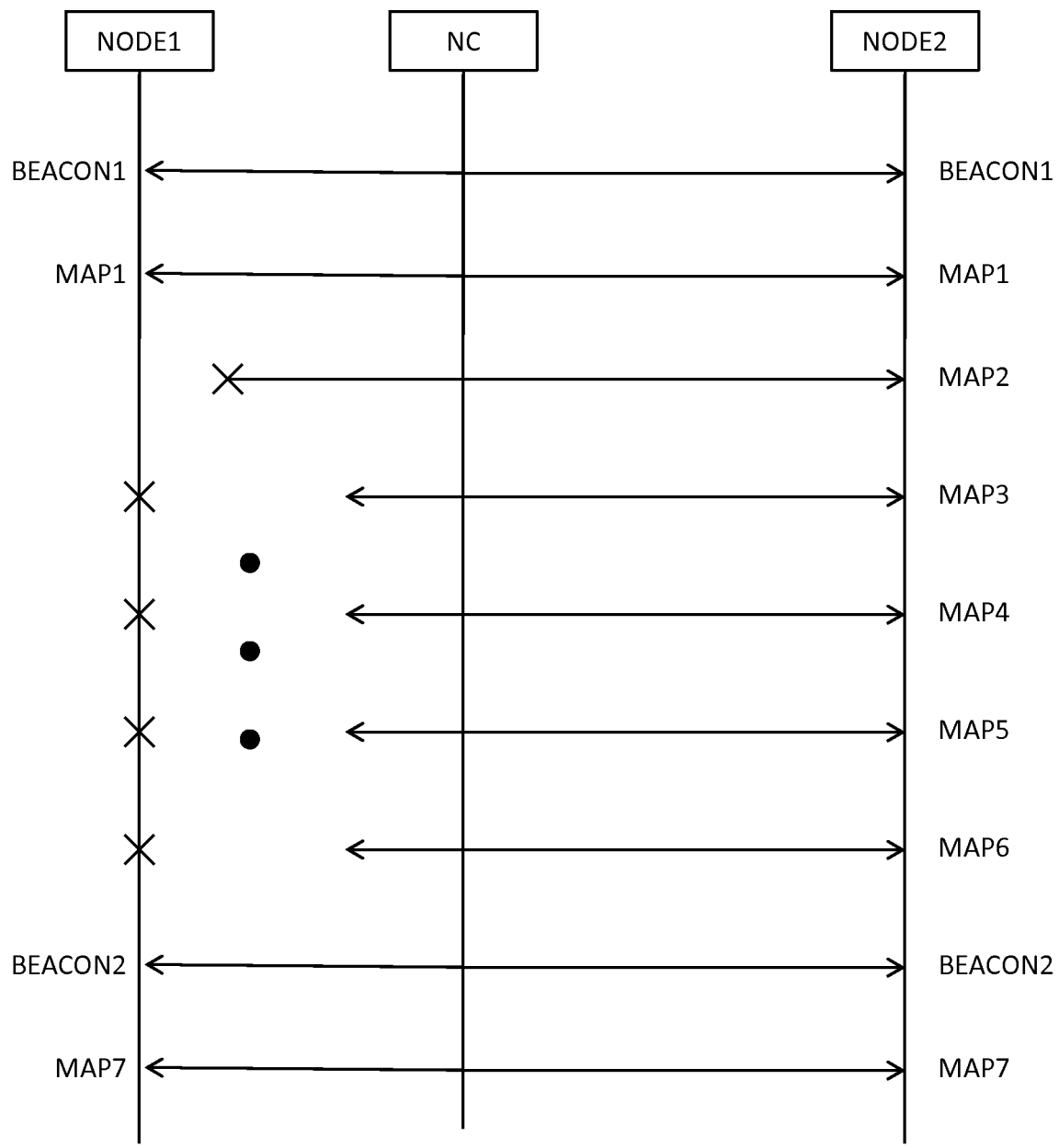
FIG. 1 is a timing diagram of a failure recovery in a conventional MoCA network.
Figure 2:
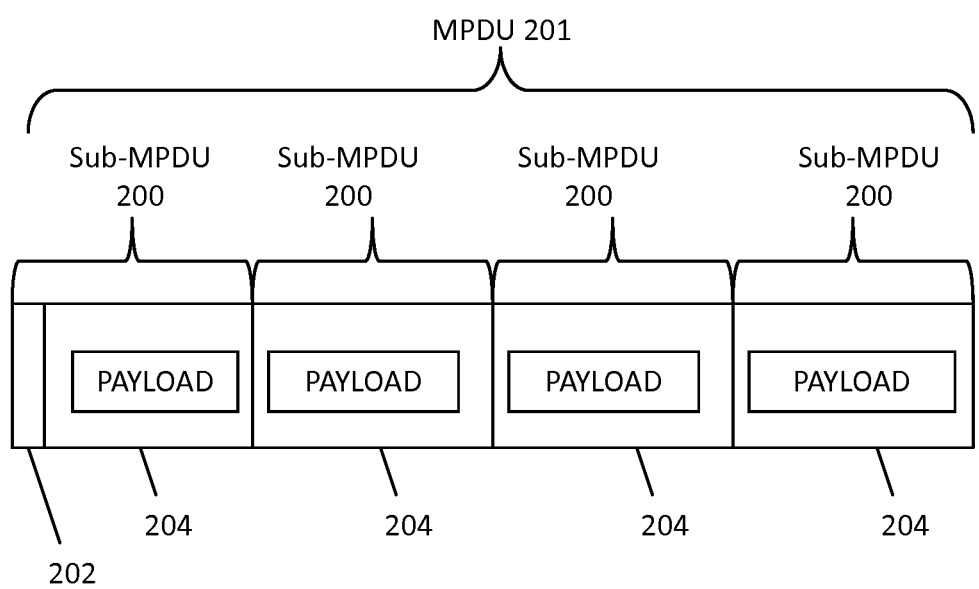
FIG. 2 illustrates one embodiment of a MAP MAC Protocol Data Unit (MPDU).

As illustrated in FIG. 2, in one embodiment of the disclosed method and apparatus, a MAP MAC Protocol Data Unit (MPDU) 201 includes a plurality of Sub-MPDUs 200 that are successively appended to each other. The header 202 of the first Sub-MPDU 200 identifies the exact number of the Sub-MPDUs in this series of Sub-MPDUs, each having the same length and each having been independently encoded. Alternatively, the length of each Sub-MPDU can vary in a predetermined manner. Since each Sub-MPDU 200 has been independently encoded, each can also be independently decoded. Alternatively, each Sub-MPDU can be encoded together in a single encoding process. However, each Sub-MPDU would not then be able to be independently decoded and the benefit of having the header carry the number of Sub-MPDUs 200 that are contained within the MPDU 201 would be lost. Each Sub-MPDU 200 may have a length of 400 bytes including the header 202 (for the first Sub-MPDU only) and payload 204. Accordingly, the MPDU 201 may have a length of 1600 bytes and each Sub-MPDU 200 may have a length of 400 bytes. One skilled in the art will appreciate that other lengths may be implemented for the MPDU 201 and the Sub-MPDUs 200.

Figure 6:
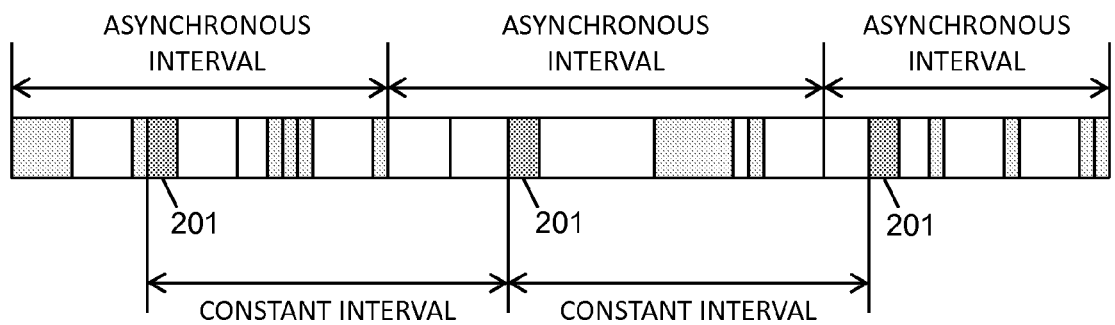
FIG. 6 illustrates a fixed packet transmission interval in an asynchronous data network.

In one embodiment, the NC transmits the MAP MPDUs 201 at constant intervals in an asynchronous network as illustrated in FIG. 6. Transmitting MAPs at constant intervals enables a network node 700 to more rapidly recover from missing a MAP than can be done in a conventional MoCA network, as explained in greater detail below. The constant intervals may be changed by providing notice to each of the network nodes of the impending change. The notice may be included in the header 202 or payload 204 of MAPs as a next packet transmission interval value in conjunction with a countdown value that identifies a number of MAPs after which the packet transmission interval will change. The countdown value may be decremented in each successively transmitted MAP MPDU until the value reaches a zero, after which the MPDU transmission interval is changed. For example, the MPDU transmission interval may be changed from a 1 ms interval to a 0.75 ms interval after the next MAP MPDU is received by communicating a next packet transmission value of 0.75 and a countdown value of '2' in a MAP.

Regardless of the format of the MAP that is implemented in the network, a network node 700 receiving an MPDU 201 may use the information from the MPDU 201 to accurately calculate the arrival of the next MAP or a subsequent MAP if an intervening MAP is not received or correctly processed, e.g., if a failure occurs. In one embodiment, that information includes the current value of the constant interval or the value of a new constant interval communicated as shown in FIG. 6. For example, if the NC transmits MAPs having multiple Sub-MPDUs 200 as illustrated in the embodiment of FIG. 2, then the network node will decode each of the Sub-MPDUs 200 and check the first Sub-MPDU header to determine if there are any successive Sub-MPDUs 200. If the first Sub-MPDU header 202 identifies that there are no successive Sub-MPDUs 200, then the node 700 has processed all of the Sub-MPDUs that were sent, having processed only the first Sub-MPDU. However, if the first Sub-MPDU header 202 identifies that there are additional successive Sub-MPDUs 200, then the node 700 will process these Sub-MPDUs as well. In this manner, the node will be able to correctly identify and receive each MAP.

Alternatively, if the NC transmits MAPs in a single Sub-MPDU 200, then a node 700 assumes that the next MAP MPDU 201 has the largest possible size (e.g., 1600 bytes) and calculates the ending transmission time of the MAP MPDU 201 based on this assumption. The network node 700 receives all of the bits for the calculated MAP transmission interval and decodes the received bits of each Sub-MPDU 200 one by one. As the network node 700 processes the bits of the Sub-MPDU header 202 it identifies the actual length of the MAP MPDU 201 and then recovers the MAP MPDU 201 bytes from the received bits. The network node 700 may disregard and not process any bits identified by the MAP Sub-MPDU header 202 as not including payload data.

Figure 3:
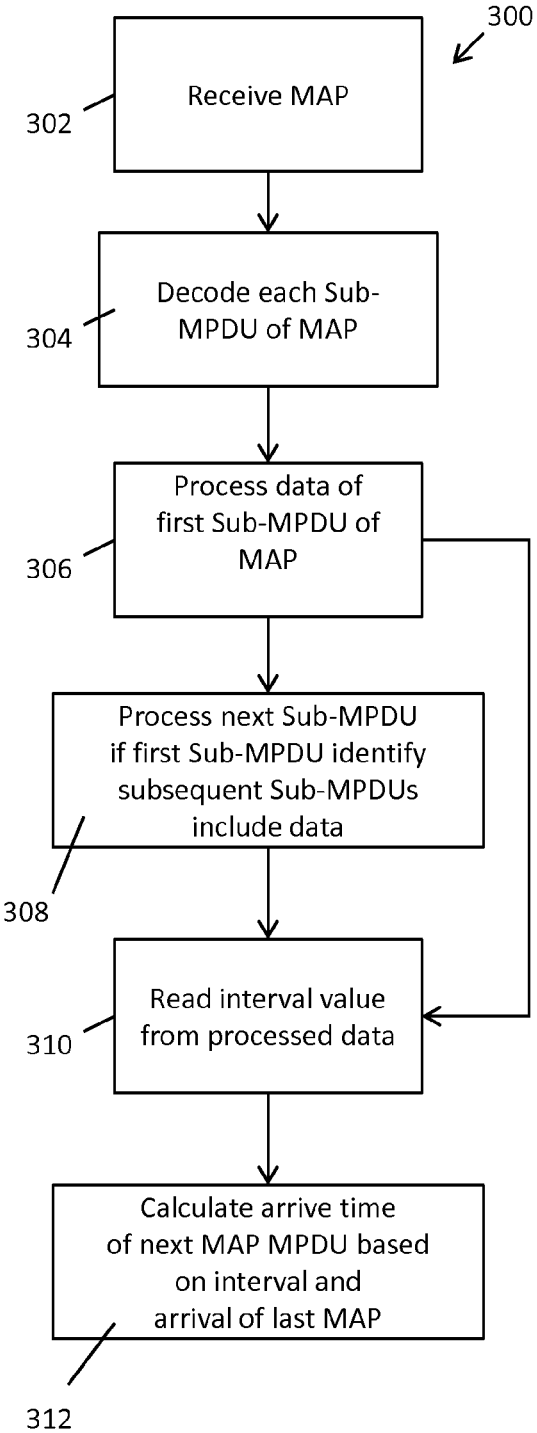
FIG. 3 is a flow chart illustrating one embodiment of a method of processing a MAP packet.

FIG. 3 is a flow diagram illustrating one example of a method 300 of processing the MAP Sub-MPDUs 200 at a network node 700. As shown in FIG. 3, a MAP is received at a network node 700 at block 302. The network node 700 decodes each Sub-MPDU 200 of the MAP at block 304. At block 306, the network node 700 processes the header 202 and payload 204 of the first Sub-MPDU 200. The network node 700 will process the next Sub-MPDU 200 or sub-Sub-MPDUs, if the processed data of the first Sub-MPDU 200 identifies that the subsequent Sub-MPDUs 200 include data to be processed at block 308. However, the network node 700 may skip block 308 and not process data from the subsequent Sub-MPDU 200 if the processed data of the first Sub-MPDU 200 identifies that the subsequent Sub-MPDUs 200 do not include data to be processed.

At block 310, a packet transmission interval value, a countdown value, and a next packet transmission interval value are read from the processed data. The packet transmission interval value, countdown value, next packet transmission interval value, and the arrival time of the packet may be stored in a computer readable storage medium 704 of the network node 700, so that it may be used in the event of a failure as described in greater detail below. The network node 700 may calculate the arrival of the next MAP based on the interval value, the countdown value, and the arrival of the previous MAP MPDU 201. In this manner, the network node 700 processes each of the MAP Sub-MPDUs and stores the interval, countdown value, and arrival time of the last packet to enable the network node 700 to recover from failing to receive or correctly process a subsequent MAP Sub-MPDU 200.

Figure 4:
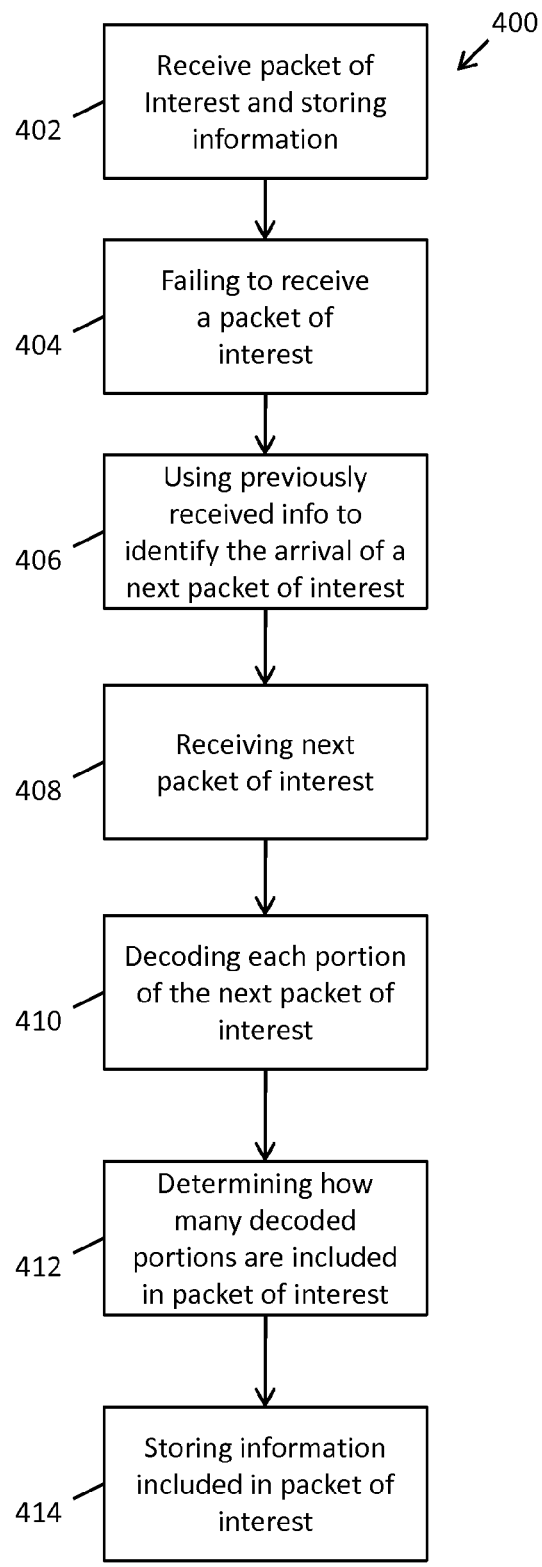
FIG. 4 is a flow chart illustrating one embodiment of a method of recovering from a failure.
Figure 5:
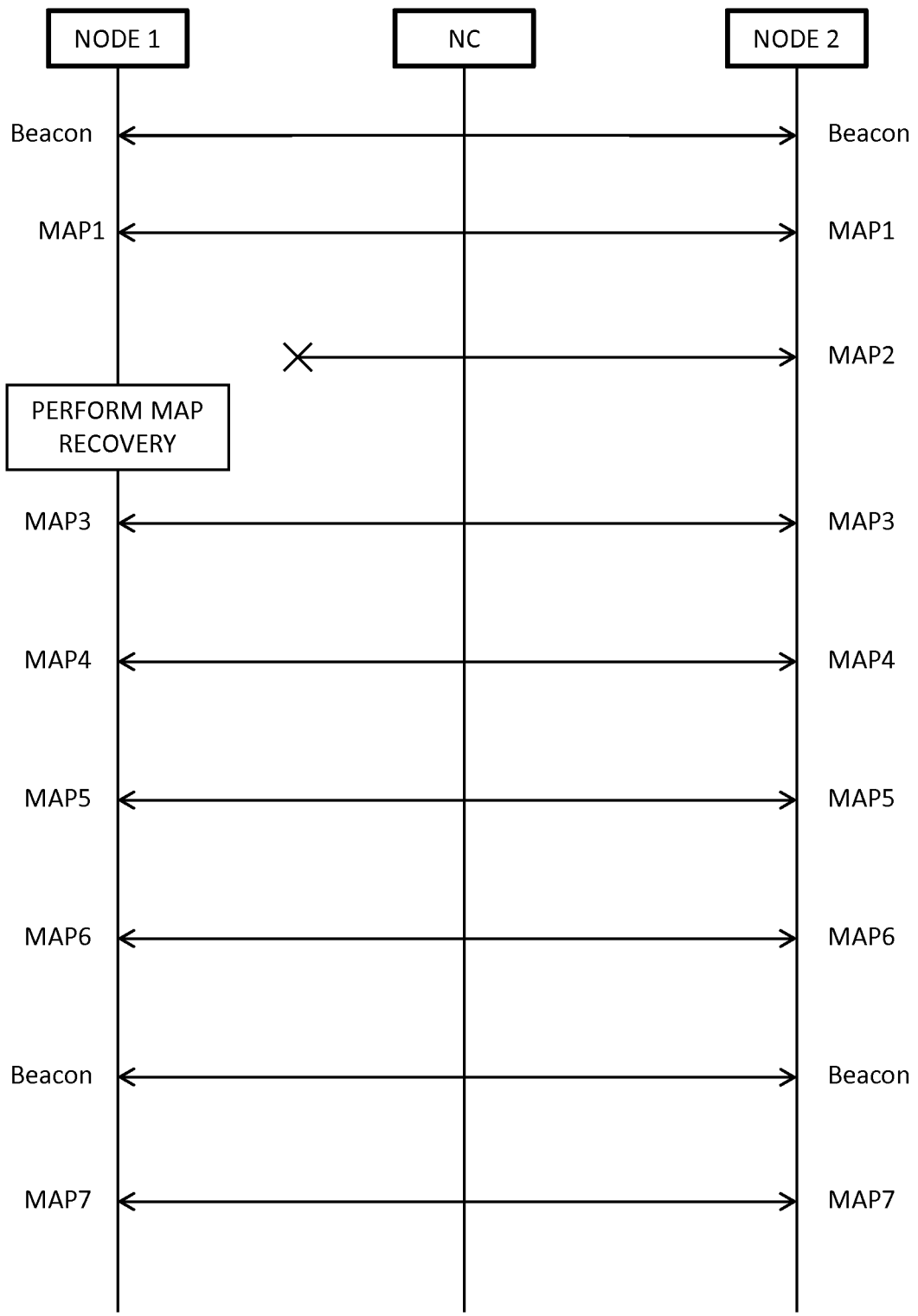
FIG. 5 is a timing diagram of one embodiment of a recovery of a node in a network after missing a packet.

FIG. 4 is a flow diagram illustrating one example of a method 400 for recovering from failing to receive or correctly process a packet of interest, such as a MAP Sub-MPDU 200. At block 402, a network node 700 receives a packet of interest. The packet of interest is decoded and processed as described above with respect to FIG. 3. The information from the packet of interest, such as, for example, the arrival time of the packet, the current packet transmission interval, a countdown identifier, and a next packet transmission interval value are saved in computer readable storage medium 704.

At block 404, the network node 700 determines that it has failed to receive or correctly process a packet of interest. Once the network node 700 determines that it has not received a packet of interest, then the node 700 commences failure recovery by reading the information received in the previously received packet of interest from computer readable storage medium 704 at block 406. As described above, the information may include the arrival of the previously received packet of interest, the current packet transmission interval, a countdown identifier, and a next packet transmission interval value. The network node 700 may then use the information read from the computer readable storage medium 704 to determine when the next packet of interest will arrive.

For example, if the interval between successive packets of interest is not going to change, then the network node 700 will use the arrival time of the previously received packet and the current packet transmission interval value to determine the arrival time of the next packet of interest. If the calculated arrival time of the next packet of interest has already passed, then the network node 700 may double, triple, or otherwise multiply the packet transmission interval value to identify the time of arrival of the next packet of interest as will be understood by one skilled in the art.

The network node 700 may also check the countdown value to determine if the interval between packets was going to be changed after the next packet. For example, if the previously received packet of interest had a countdown value of '1', then the subsequent packet of interest, e.g., the packet which was not received by the network node 700, had a countdown value of '0'. Accordingly, the network node 700 determines that the next packet of interest is going to be transmitted at a different packet transmission interval, and the network node 700 will use the new packet transmission interval value in conjunction with the previous packet transmission interval value and the arrival time of the last received packet to determine the arrival of the next packet of interest. For example, if the previously received packet arrived at time t, the previous packet transmission interval value was 1 ms, and the new packet transmission interval value is 0.7 ms, then the network node 700 would calculate that the next packet of interest will arrive at t+1.7 ms.

At block 408, the network node 700 receives the next packet of interest. Upon receipt of the next packet of interest, the network node 700 decodes each portion of the packet at block 410 as described above. The network node 700 determines the number of portions that are included in the packet of interest at block 412. If the first portion identifies that each portion of the packet includes data, then the network node 700 will process each of the packet portions. However, if the first portion of the packet identifies that one or more of the packet portions do not include data, then the network node 700 may discard these portions of the packet. At block 414, the network node 700 may store information included in the packet of interest in the computer readable storage medium 704. As described above, the information may include a current packet transmission interval value, a countdown value, a next packet transmission interval value, and the arrival time of the previously received packet of interest. One skilled in the art will understand that other information may be stored in the computer readable storage medium 704.

The system and method described above enables network nodes to be able to recover from conditions in which the node misses important data packets in networks in which data is transmitted faster than in conventional systems. Faster recovery from missed data packets reduces the amount of data missed by a network node in the event of a failure, thus improving the efficiency of the network.

Although the disclosed method and apparatus has been described in terms of particular embodiments, the claimed invention is not limited thereto. Rather, the appended claims should be construed broadly, to include other variants and embodiments of the disclosed method and apparatus which may be made by those skilled in the art without departing from the scope and range of equivalents of the claimed invention. Delimiters used in the claims—such as 'a)' and 'i)'—should not be taken as imputing any order to the claims, but rather are provided only to serve as visual cues to add in the parsing of the claims and as identifiers in the event that a particular portion of the claim is to be later referenced.

What is claimed is:

1. A method for Media Access Plan (MAP) failure recovery, comprising:
   a) receiving a first Media Access Plan (MAP) MAC Protocol Data Unit (MPDU) containing a payload and a first MAP interval value, wherein the first MAP interval value indicates an MPDU transmission interval that remains constant between MAP MPDU transmissions until notice of a change is received;
   b) decoding the first MAP MPDU and the first MAP interval value; and
   c) predicting an arrival time of at least a second MAP MPDU and upon missing the second MAP MPDU, predicting an arrival time of a third MAP MPDU based on the decoding of the first MAP interval value.

2. The method of claim 1 wherein the first MAP MPDU comprises a set of Sub-MPDUs, and wherein decoding the first MAP MPDU and the MAP interval value comprises decoding the first MAP MPDU and the MAP interval value in a header of a first Sub-MPDU of the set of Sub-MPDUs.

3. The method of claim 2 wherein each Sub-MPDU within the set of Sub-MPDUs is of equal length.

4. The method of claim 2 wherein each Sub-MPDU within the set of Sub-MPDUs is of variable length.

5. The method of claim 1 wherein the first MAP MPDU comprises a notice indicating a change in the first MAP interval value to a second MAP interval value and a countdown value identifying a number of remaining MAP MPDUs to be transmitted and spaced at the first MAP interval value.

6. The method of claim 1 wherein the Sub-MPDUs are independently encoded.

7. The method of claim 6 further comprising independently decoding the independently encoded Sub-MPDUs.

8. A network node, comprising:
   a) a computer readable storage medium; and
   b) a processor in data communication with the computer readable storage medium, the processor configured to:
      a. receive a first Media Access Plan (MAP) MAC Protocol Data Unit (MPDU) containing a payload and a first MAP interval value,
      wherein the first MAP interval value indicates an MPDU transmission interval that remains constant between MAP MPDU transmissions until notice of a change to the first MAP interval value is received;

b. decode the first MAP MPDU and the first MAP interval value: and
c. predict an arrival time of at least a second MAP MPDU and upon missing the second MAP MPDU, predicting an arrival time of a third MAP MPDU based on the decoding of the first MAP interval value.

9. The network node of claim 8 wherein the first MAP MPDU comprises a set of Sub-MPDUs, and wherein decoding the first MAP MPDU and the first MAP interval value comprises decoding the first MAP MPDU and the first MAP interval value in a header of a first Sub-MPDU of the set of Sub-MPDUs.

10. The network node of claim 9 wherein each of the Sub-MPDUs of the set of Sub-MPDUs is of equal length.

11. The network node of claim 9 wherein each of the Sub-MPDUs of the set of Sub-MPDUs is of variable length.

12. The network node of claim 8 wherein the first MAP MPDU comprises a notice indicating a change in the first MAP interval value to a second MAP interval value and a countdown value identifying a number of remaining MAP MPDUs to be transmitted and spaced at the first MAP interval value.

13. The network node of claim 9 wherein the Sub-MPDUs are independently encoded.

14. The network node of claim 13 further comprising independently decoding the independently encoded Sub-MPDUs.

15. A non-transitory computer readable storage medium encoded with program code, wherein when the program code is executed by a processor, the processor performs a method, the method comprising:
a) receiving a first Media Access Plan (MAP) MAC Protocol Data Unit (MPDU) containing a payload and a first MAP interval value, wherein the first MAP interval value indicates an MPDU transmission interval which remains constant between MAP MPDU transmissions until notice of a change is received;
b) decoding the first MAP MPDU and the first MAP interval value; and
c) predicting an arrival time of at least a second MAP MPDU and upon missing the second MAP MPDU, predicting an arrival time of a third MAP MPDU based on the decoding of the first MAP interval value.

16. The computer readable storage medium of claim 15 wherein receiving the MAP MPDU comprises a set of Sub-MPDUs, and wherein decoding the first MAP MPDU and the first MAP interval value comprises decoding the first MAP MPDU and the first MAP interval value in a header of a first Sub-MPDU of the set of Sub-MPDUs.

17. The computer readable storage medium of claim 16 wherein each of the Sub-MPDUs of the set of Sub-MPDUs is of equal length.

18. The computer readable storage medium of claim 16 wherein each of the Sub-MPDUs of the set of Sub-MPDUs is of variable length.

19. The computer readable storage medium of claim 15 wherein MAP MPDU comprises a notice indicating a change in the first MAP interval value to a second MAP interval value and a countdown value identifying a number of remaining MAP MPDUs to be transmitted and spaced at the first MAP interval value.

20. The computer readable storage medium of claim 15 wherein the Sub-MPDUs are independently encoded.

21. The computer readable storage medium of claim 20 further comprising independently decoding the independently encoded Sub-MPDUs.

* * * * *